United States Patent [19]
Esemplare et al.

[11] 3,856,561
[45] Dec. 24, 1974

[54] RUBBER ARTICLES HAVING IMPROVED SLIP COATING

[75] Inventors: Pascal E. Esemplare, Mountainside, N.J.; Dennis Beeferman, Brooklyn, N.Y.

[73] Assignee: Sutures, Inc., Coventry, Conn.

[22] Filed: Jan. 25, 1972

[21] Appl. No.: 220,692

[52] U.S. Cl.............. 117/139, 117/62.9, 117/94, 117/95, 117/102 R, 117/161 UD, 117/161 UH, 161/242, 264/306, 2/168
[51] Int. Cl............................................ B32b 25/08
[58] Field of Search.......... 2/168; 117/139, 161 UD, 117/161 UH, 95, 96, 94; 161/242; 264/304, 306, 307; 260/29.6 R

[56] References Cited
UNITED STATES PATENTS

| | | | |
|---|---|---|---|
| 2,747,229 | 5/1956 | Teague | 264/306 X |
| 2,789,933 | 4/1957 | Bargmeyer | 161/242 X |
| 2,989,755 | 6/1961 | O'Brien et al. | 2/168 |
| 3,286,011 | 11/1966 | Kavalir et al. | 264/307 X |
| 3,298,034 | 1/1967 | Szegvari | 2/168 |
| 3,411,982 | 11/1968 | Kavalir et al. | 264/307 X |

*Primary Examiner*—William D. Martin
*Assistant Examiner*—M. R. Lusignan
*Attorney, Agent, or Firm*—Larson, Taylor & Hinds

[57] ABSTRACT

Rubber articles, such as surgeon's gloves, are provided with a synthetic resin slip coating by contacting the rubber surface with a synthetic resin latex. The synthetic resin is a vinyl chloride-alkyl acrylate copolymer or a vinylidene chloride-alkyl acrylate copolymer, for example, vinyl chloride-butyl acrylate copolymer. An excellent slip surface is thereby given to the rubber article. Accordingly, when the inner surface of a surgeon's glove is so treated, the glove is easily put on and taken off.

3 Claims, No Drawings

RUBBER ARTICLES HAVING IMPROVED SLIP COATING

BACKGROUND OF THE INVENTION

This invention relates to rubber articles having improved slip coatings and to methods of providing same. More particularly, the invention relates to rubber articles, such as surgeon's gloves, which are provided with an improved slip coating. Still more particularly, the invention relates to such articles and methods wherein the slip coating consists essentially of a synthetic resin latex. Still more halogenated the invention relates to such improved articles and methods wherein the synthetic resin comprises a vinyl chloride-alkyl acrylate copolymer.

It has previously been proposed to provide slip finishes on rubber articles such as rubber gloves or girdles by various methods. For example, the surface of a rubber glove can be halogenated with bromine or chlorine to make it slippery. However, this treatment may result in very poor ageing properties. Discoloration can begin almost immediately and, within a month, the haolgenated surface may become hard and brittle and brown in color. This can be avoided only by taking great care in the halogenation process and even then there is no assurance of obtaining a uniform, sustanined, slip film. Waxes and silicones have been used but these provide only a temporary solution as these materials rub off in a very short time. It has further been proposed in U.S. Pat. No. 3,286,011 issued Mar. 18, 1964, and U.S. Pat. No. 3,411,982 issued Mar. 18, 1964, to provide a slip finish comprising a rubber latex and a resin latex. While such coatings reduce the coefficient of friction of the rubber aritcle to a slight extent, it is desirable to further reduce the coefficient of friction. For example, it is desirable to further reduce the coefficient of friction to make it easier to put on and take off a rubber article such as a rubber glove.

It is an object of the present invention to provide an improved slip coating on a rubber article. It is a further object of the invention to provide improved methods of providing slip coatings on rubber articles. It is still a further object to provide a rubber article having a slip coating which substantially reduces the coefficient of friction of the rubber surface on which the coating is applied.

BRIEF SUMMARY OF THE INVENTION

The foregoing and other objects which will be apparent to those having ordinary skill in the art are achieved according to the present invention by providing an article including a rubber surface provided with a slip coating, the slip coating consisting essentially of a coagulated synthetic resin latex, the synthetic resin comprising a vinylidene chloride-alkyl acrylate copolymer or a vinyl chloride-alkyl acrylate copolymer. These slip coatings are provided according to the present invention by contacting a rubber surface with an aqueous synthetic resin latex, the synthetic resin of which comprises the vinylidene chloride-or vinyl chloride-alkyl acrylate copolymer, and curing the coating thus provided to form a slip coating on the rubber surface.

DETAILED DESCRIPTION OF THE INVENTION

The rubber surface on which the slip coating is provided may be fabricated from any suitable conventional latex dipping compound such as those disclosed in U.S. Pat. No. 3,411,982. The latex may be pre-cured or non pre-cured latex in which case the rubber article is cured after forming. The latex dip may contain conventional compounding ingredients commonly utilized. Specific examples are given in U.S. Pat. No. 3,411,982. The rubber may be natural rubber or any conventional latex suitable for dipping operations. Of the various natural and synthetic latices, natural rubber, polychloroprene rubber, synthetic polyisoprene, SBR, and mixtures thereof are preferred. Conventional formulations for each of these rubbers are well known in the art and those skilled in the art are readily able to vary the formulations and conditions of curing and the like to suit the particular latex being used as well as the particular final article desired. Similarly, the article can vary widely and includes gloves, particularly surgeon's gloves, girdles, and the like.

The synthetic resin latex utilized according to the present invention is a copolymer or vinyl or vinylidene chloride and alkyl acrylate. By "alkyl acrylate" is meant alkyl esters of acrylic or methacrylic acid. The alkyl group is preferably methyl, ethyl, propyl, or butyl and butyl is preferred. The copolymer includes from 20 to 80 mole percent of the vinyl or vinylidene chloride units and, correspondingly, from 80 to 20 mole percent of the acrylate units. Preferably, the vinyl or vinylidene chloride units comprise from 40 to 60 mole percent of the copolymer and the acrylate units correspondingly comprise from 60 to 40 mole percent of the copolymer. The copolymer may also include up to 5 molar percent, based on the total amount of vinyl or vinylidene chloride and alkyl acrylate, preferably from one-half to 5 mole percent, of acrylic acid or methacrylic acid units. The copolymer may also include any of the conventional vinyl resin plasticizers in amounts of generally up to about 5 mole percent. Suitable plasticizers include tricresyl phosphate, dibutyl phthalate, dibutyl sebacate, tributyl phosphate, dioctyl phthalate, trioctyl phosphate, dioctyl sebacate, dioctyl adipate, low molecular weight polymers such as poly(propylene glycol) esters, and the benzoate plasticizers such as 2-ethylhexyl-p-oxybenzoate.

The improved slip coating according to the invention is preferably provided on a rubber surface by contacting the rubber surface with an aqueous latex consisting essentially of water and the vinyl chloride-acrylate copolymer. Alternatively, the slip coating can be first provided on a form and the form subsequently dipped into a rubber latex as disclosed in U.S. Pat. No. 3,411,982.

The slip coating provided by the present invention has excellent characteristics of slipperiness. A simple way to demonstrate the slipperiness of rubber according to the invention is to place two coated rubber surfaces together and rub the rubber surfaces back and forth while grasped between the fingers. Previous slip coatings which have been tested do not slip at all when held in this manner. However, the coatings provided by the present invention readily slip irrespective of the amount of grasping pressure applied. Furthermore, the coatings provided by the present invention are tenaciously adhesive and the rubber substrate can be stretched without affecting the slipperiness of the slip coating according to the present invention. There follows examples according to the invention and examples showing coatings according to the teachings of U.S. Pat. No. 3,411,982. The results of the examples clearly show that the slip coating according to the present in-

EXAMPLE 1

A clean glove form is first utilized to make conventional surgeon's gloves from natural rubber by dipping the form into an aqueous natural rubber latex composition made by mixing 3 parts by weight of a conventional 60% solids natural rubber latex (e.g. Lotol L 9241) in 2 parts by weight of water. Immersion of the form is fairly slow but withdrawal is rapid so that there is streaming of latex down the form. At the point where the thumb of the form starts to emerge from the latex, the form is tilted to a slight angle so that the latex runs between the thumb and first finger. At the point where the form is completely out of the latex, the form is tilted in the opposite direction. The form is then reverted to the vertical position and allowed to drain from the finger tips until no further dripping takes place. The form is then rotated so that the fingers are up. The form is then dipped into coagulant solution comprising 20% acetic acid in isopropyl alcohol, removed and allowed to dry at room temperature approximately two to three minutes. The form is again dipped into the natural rubber latex. Dwell time is 5 to 10 seconds. The dwell time in this step determines the gauge of the glove. Withdrawal of the form is done in the same manner as described above. The form is dipped into the coagulant again, removed and allowed to dry at room temperature approximately 2 to 3 minutes.

The form is now dipped into an aqueous composition made by dispersing 5 parts by weight of a 50% solids content synthetic resin latex in 4 parts by weight of water. The synthetic resin is a conventional solid synthetic resin copolymer of approximately equi-molar amounts of vinyl chloride and butyl acrylate and also containing about 3 mole percent acrylic acid units along the polymer backbone. The dwell time in the synthetic resin latex is about 30 seconds. Withdrawal of the form is done in the same manner as described above. The form is then dried for approximately 60 minutes in a forced air oven maintained between 180° and 185°F. The gloves are now stripped from the form in hot water and placed in a hot water (190° to 200°F) leaching tank for 12 to 16 hours, followed by drying at 180° – 185°F for 1 hour.

The gloves are then turned inside out such that the slip coating is on the inside and are tested for slipperiness in two ways. First, the gloves are repeatedly put on and removed. Second, with the slip coating surfaces innermost, the palm area of the glove is grasped between the fingers and, with grasping pressure applied, the fingers are rubbed back and forth whereupon the inner glove surfaces, if sufficiently slippery, will slip relative to each other. In this example, the gloves are very easily put on and taken off and, in the grip test, even under heavy grasping pressure, the inner surfaces easily slip.

EXAMPLE 2

Surgeon's gloves are prepared according to the procedures given in U.S. Pat. No. 3,411,982. In this example, the slip coating is polyethylene. The gloves are noticeably more difficult to put on and take off than those of Example 1 and, with light gripping pressure, the inner surfaces do not slip.

EXAMPLE 3

Surgeon's gloves are prepared as in Example 2 except that the slip coating is acrylate copolymer (Rhoplex B-85) according to procedures given in U.S. Pat. No. 3,411,982. The gloves are noticeably more difficult to put on and take off than those of Example 1 and are about the same as those of Example 2 in this respect. The inner glove surfaces do not slip irrespective of how slight the grasping pressure.

EXAMPLE 4

A clean glove form is first utilized to make conventional surgeon's gloves from natural latex by dipping the form into calcium nitrate solution in ethyl alcohol, 20% solids. The form is pre-heated to 175°F then immersed into the calcium nitrate slurry. The form is allowed to dry for about 1 minute. The form is then slowly dipped into an aqueous natural rubber latex of 40% solids. The dwell time is from 5 to 30 seconds in the natural rubber latex and the form is slowly removed from the latex solution. When removed, the form is rotated in an arc of 180° so as to smooth out the last drops of the latex from the fingers. The dwell time determines the gauge of the gloves. The latex on the form is allowed to coagulate for about 2 minutes. The coagulated glove on the form is placed into a conventional leaching tank at 135°F for 25 minutes. The form is then removed from the leaching tank and is now dipped into an aqueous composition made by dispersing 5 parts by weight of a 50% solids content synthetic resin latex in 7 parts by weight of water. The synthetic resin is a conventional solid synthetic resin copolymer of approximately equi-molar amounts of vinyl chloride and butyl acrylate and also containing about 3 mole percent acrylic acid units along the polymer backbone. The dwell time in the synthetic resin latex is about 30 seconds. Withdrawal of the form is done in the same manner as described above. The form is then dried for approximately 60 minutes in a forced air oven maintained at about 175°F. The gloves are now stripped from the form in warm water (120°F) and placed in a hot water (205°F) leaching tank for 3 to 4 hours. The gloves are dried at 135°–140°F for 1 hour in a tumbler drier. Results are similar to Example 1.

EXAMPLE 5

Example 4 is followed except that the resin is a 50/50 mole ratio vinylidene chloride/butyl acrylate resin containing 3 mole percent acrylic acid. Results are similar to Example 1.

EXAMPLES 6–12

Several additional resins are tested as in Example 1 and the results were completely negative. The resins tested are as follows:

| Example | Resin |
| --- | --- |
| 6 | Vinyl acetate homopolymer (large particle size) |
| 7 | Vinyl acetate homopolymer (small particle size) |
| 8 | Vinyl acetate/carboxylic comonomer copolymer |
| 9 | Vinyl acetate/maleate ester copolymer |
| 10 | Vinyl acetate/maleate ester/COOH terpolymer |
| 11 | Vinyl acetate/acrylic ester copolymer |
| 12 | Vinyl acetate/acrylic ester/COOH terpolymer |

It will be seen that by comparing the results of the foregoing examples, the present invention provides a remarkably improved slip coating. This coating is provided, however, without any sacrifice in adhesion. Moreover, the rubber substrate can be stretched and the slip coating retains its advantageous slippery properties. The thickness of the coating can be varied by simply varying the amount of time in the dipping operation or by applying several coats, all of which is conventional in the art. In general, it is desired to obtain a uniform coating over the desired area of the substrate and coatings will therefore, in general, be at least 0.0005 inch in thickness to achieve this end when conventional dipping techniques are utilized. Of course, if improved coating techniques are utilized, thinner coatings can be provided and will form a continuous coating. In general, therefore, the thickness of the coating will be sufficient such that, using a given coating technique, a uniform coating over the desired surface area is achieved.

What is claimed is:

1. An article including a rubber surface provided with a slip coating, said slip caoting consisting essentially of a copolymer selected from the group consisting of vinyl chloride-alkyl acrylate copolymer and vinylidene chloride-alkyl acrylate copolymer, said copolymer comprising from 20 to 80 mole percent vinyl chloride or vinylidene chloride units and, correspondingly, 80 to 20 mole percent alkyl acrylate units.

2. An article according to claim 1 wherein said copolymer includes up to 5 mole percent, based on the amount of said vinyl chloride or vinylidene chloride and alkyl acrylate units, of acid units selected from the group consisting of acrylic acid and methacrylic acid.

3. An article according to claim 2 wherein said copolymer includes at least one-half percent of said acid units.

* * * * *